United States Patent [19]
Uchida et al.

[11] 4,100,072
[45] Jul. 11, 1978

[54] EFFLUENT OIL COLLECTING VESSEL

[75] Inventors: Shoji Uchida, Nagayo; Hiroshi Takeshita; Shozo Yamazaki, both of Nagasaki, all of Japan

[73] Assignee: Mitsubishi Jukogyo Kabushiki Kaisha, Tokyo, Japan

[21] Appl. No.: 787,453

[22] Filed: Apr. 14, 1977

[30] Foreign Application Priority Data

May 10, 1976 [JP] Japan .................. 51-58991

[51] Int. Cl.² .................................. E02B 15/04
[52] U.S. Cl. ..................... 210/242 S; 210/DIG. 25
[58] Field of Search ............. 210/DIG. 25, 83, 242 S

[56] References Cited
U.S. PATENT DOCUMENTS

| 3,348,690 | 10/1967 | Cornelissen | 210/DIG. 25 |
| 3,670,896 | 6/1972 | Hale, Jr. et al. | 210/DIG. 25 |
| 3,703,463 | 11/1972 | Bhuta et al. | 210/DIG. 25 |
| 3,727,766 | 4/1973 | Horne | 210/DIG. 25 |
| 3,951,810 | 4/1976 | Crisafulli | 210/DIG. 25 |
| 4,033,869 | 7/1977 | McGrew | 210/242 S |

*Primary Examiner*—Theodore A. Granger
*Attorney, Agent, or Firm*—Wenderoth, Lind & Ponack

[57] ABSTRACT

An improved oil collecting vessel of the twin-hull type is described here. An oily water suction means is provided with a float that supported by a linkage mechanism which in turn is fixedly secured to an upper deck of the vessel. The oily water suction means may therefore be raised or lowered without changing its direction so as to follow the wave motion of the water surface region delimited at its opposite side edges by the hulls. Oily water floating on the water surface region is sucked through the oily water suction means and is conveyed to a tank in the vessel through a suction pipe. The suction of the oily water is enhanced by an ejector provided in the midway of the suction pipe. An effluent oil converging section is provided in a reentrant form in front of the oily water suction means and is delimited by guide plates on its opposite sides. In front of the oily water suction means is a jet water injection port. In order to prevent a gap space from being formed between the hulls and the oily water suction means in front of the oily water suction port, rubber guides are fixedly secured to the hulls in the proximity of the water line.

6 Claims, 2 Drawing Figures

EFFLUENT OIL COLLECTING VESSEL

The present invention relates to improvements in an effluent oil collecting vessel of twin-hull type in which effluent oil is introduced into a water surface area between the opposite hulls and then collected by suction means.

BACKGROUND OF THE INVENTION

In the heretofore known effluent oil collecting vessel of twin-hull type, effluent oil collecting means is provided between the opposite hulls of the twin-hull, and while the vessel is advancing, effluent oil flowing into the water surface area between the opposite hulls is collected. The effluent oil suction means are roughly classified into four types, that is, a vortex type in which oil is collected to the center by making use of a vortex; a rotary belt type in which oil is forcibly conveyed together with the sea water into a tank by making use of an inclined rotary belt; a rotary drum type in which blades are fixedly secured to a drum and oil is taken in by rotating the drum; and a natural inflow type in which the water line is utilized, and while navigating, floating oil is taken into a tank by making use of a weir or an inclined plate. However, these effluent oil suction means which have been heretofore used and which are of fixed type, would follow pitching and rolling motions of a vessel and would move jointly with the hull of the vessel, and thus since the suction means cannot follow the waves, an oil collecting efficiency under a waved condition is bad.

Also, when the suction means is made to float by means of a float and is hung with a rope, an opening portion sinks into waves or floats up above the water surface, and the oil collection efficiency is lowered. In addition, dusts or seaweeds are liable to adhere to an oil intake port together with oil, resulting in blocking of the oil intake port, and when the adhesion becomes very high due to the high viscosity of the effluent oil, cleaning must be performed frequently. Still further, there are inconveniences and disadvantages when the oil is dispersed by tides; winds and waves, then it took considerable time to collect the oil. Also, if the oil layer is thin, then a large amount of sea water is sucked, resulting in reduction of the oil collection efficiency.

SUMMARY OF THE INVENTION

The present invention has been worked out in order to eliminate the above-described inconveniences and disadvantages, and the invention provides an effluent oil collecting vessel of twin-hull type, in which in the space between the opposite hulls, a float-suction section provided with a jet water injection port is hung from the hulls via linkage means so as to continuously follow the waves. There are rubber guides to prevent the effluent oil from leaking backwardly through the gaps between the hulls and the float-suction section, and oily water introduced to the float-suction section is sucked by an ejector and fed to a tank in the vessel.

BRIEF DESCRIPTION OF THE DRAWINGS

Now one preferred embodiment of the present invention will be described with reference to the accompanying drawings, in which.

DETAILED DESCRIPTION OF THE INVENTION

Figure 1:
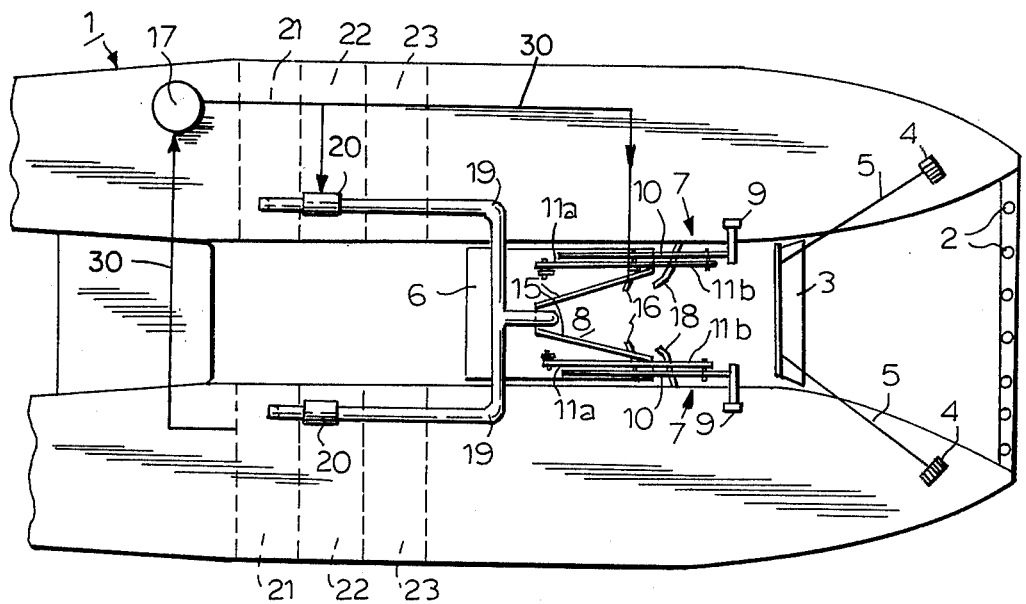
FIG. 1 is a plan view of one preferred embodiment of an effluent oil collecting vessel of twin-hull type according to the present invention.
Figure 2:
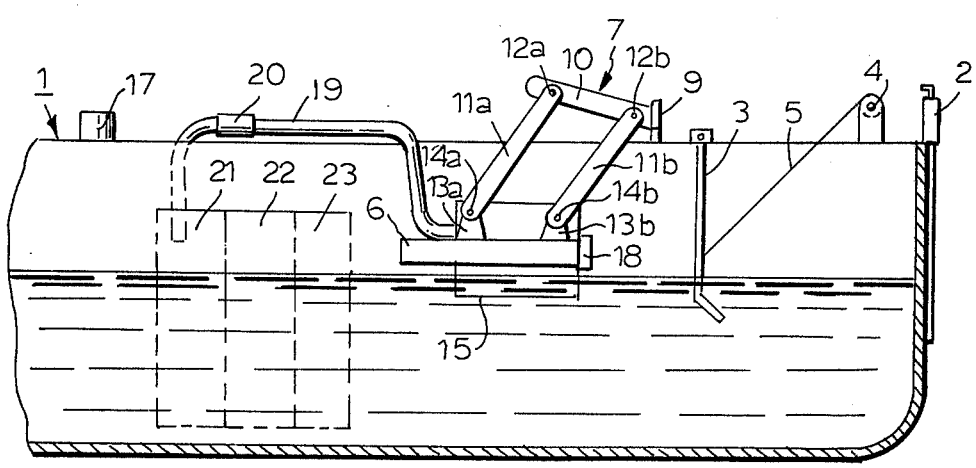
FIG. 2 is a side view of the embodiment shown in FIG. 1 with one of the hulls of the twin-hull structure being removed.

Referring to the drawings, reference numeral 1 designates a twin-hull type vessel which has at the bows a plurality of trash prevention bars 2 for preventing large articles of trash such as wood blocks of the like from flowing into the space between the opposite hulls of the twin-hull structure. These bars 2 are spaced vertically at a fixed interval so as to be freely extracted or inserted, and a trash catch net 3 for catching small articles of trash which pass through the trash prevention bars 2 is pivotably mounted so that it may be pulled up forwardly via cables 5 by means of a winch 4 or may be lowered by paying off the cables 5 in the space between the opposite hulls and behind the trash protection bars 2.

Between the parallel hulls of the twin-hull structure behind the trash catch net 3, a float-suction section 6 consisting of a float provided with a suction effect is hung via linkage means 7 and is made to float on the sea so as to follow the vertical movement of waves. In other words, in the float-suction section 6, a converging section 8 disposed in a reentrant form as flared forwardly, is formed, and linkage means 7 are mounted to the both left and right sides of the float in a symmetrical manner. These linkage means apply a parallel movement mechanism employing a four-joint rotary mechanism. Linkage mount members 9 are projected from the inner sides of the opposite hulls of the twin-hull structure as opposed to each other, and support rods 10 are fixedly secured to said linkage mount members 9 along the longitudinal sides of the float. These support rods 10 are mounted with their tip ends directed somewhat upwardly at a certain angle with respect to a deck, and to each of the support rods 10 are pivotably mounted parallel links 11a and 11b of equal length via pins 12a and 12b, respectively. The parallel links 11a and 11b extend obliquely in the rear downward direction, and the lower ends of the links 11a and 11b are pivotably mounted to protrusion plates 13a and 13b projecting from the top surface of the float via pins 14a and 14b, respectively. The protrusion plate 13a is longer than the protrusion plate 13b. In this manner, the float is maintained in a horizontal position. It is to be noted that as means for preventing sparks due to friction, members made of copper are interposed in the frictional parts of the linkage means.

In addition, along the left and right side surfaces of the flared space of the above-mentioned converging section 8, guide plates 15 are mounted which have their lower edges sunk under the sea level deeper than the bottom surface of the float and having their upper edges positioned higher than the top surface of the float. Reference numeral 16 designates jet water injection ports on the left and right side walls of the front portion of said converging section 8 which penetrate through the guide plates 15 in the proximity of the water line with the tip ends of the nozzles directed obliquely backwards. These jet water injection ports are connected to a high-pressure water feed pump 17 on the vessel through pipes, and the portions of the pipes to be connected to the injection ports 16 are formed of flexible pipes 30.

Still further, in order to prevent the oil from leaking backwardly through the gap spaces between the side surfaces of the float and the side surfaces of the hulls, rubber guides 18 are mounted to the hulls in the proximity of the water line so as to block the gap spaces, and lead the oil to the converging section 8.

The oil caught in the float is sent through an intake pipe 19 opening at the converging section 8 to an oily water storage tank 21 together with seat water. Midway of the intake pipe 19 is an ejector 20 that is connected to the high-pressure water feed pump 17, so that the oily water is sucked up by the suction effect of the ejector 20 and is discharged into the tank 21. Pressurized water is fed from the oily water storage tank 21 to the ejector 20 and the water jet injection nozzles 16 by means of the high pressure water feed pump 17. The tip end portion of the intake pipe 19 is formed of a flexible pipe to make it possible to follow the movement of the float.

Reference numeral 22 designates a tank for separating the oily water fed from the oily water storage tank 21 into oil and water, and reference numeral 23 designates a collected oil tank for collecting and storing the oil separated in the oily water separating tank 22. The sea water separated in the oily water separating tank 22 is exhausted out of the vessel by means of a drainage pump. The collected oil is conveyed to a ground installation or to a barge by means of a conveyor pump.

When effluent oil is collected by means of the above-described effluent oil collecting vessel of the twin-hull type while the vessel is advanced at a very slow speed, large articles of trash are prevented from entering by means of the trash prevention bars 2, and small articles of trash are caught by the trash catch net 3. During the effluent oil collecting operation, the high-pressure water feed pump 17 is first actuated to forcibly feed high-pressure water to the jet water injection nozzles 16 and the ejector 20. The jet water injected from the jet water injection nozzles forcibly introduces the effluent oil into the converging section 8, and the oil having flowed into the converging section 8 is sucked jointly with the sea water by the suction effect of the ejector 20, is passed through the intake pipe 19 and is finally discharged into the oily water storage tank 21. In addition, the jet water serves to remove the oil adhering to the guide plates 15.

Because of the presence of the rubber guides 18, the oil which flows into the space between the opposite hulls of the twin-hull structure does not escape backwardly through the gap spaces between the float and the hulls. During the operation, the float is suspended by the linkage mechanism 7 and is subjected to vertical movements following the waves while always being maintained parallel to the hulls, so that the tip of the float does not project out of the sea surface nor does it project into the waves.

As described above, according to the present invention, since the float-suction section for sucking oily water is connected to the hulls by the intermediary of the linkage means, the nature of following the waves is maintained, and thereby the oil collecting efficiency under waved conditions is enhanced. Since the oil having flowed into the float converging section is strongly sucked by the ejector, blocking of the intake pipe caused by adhesion of trashes and oil is prevented, and suction of oily water is greatly improved. In addition, by injecting jet water against the float converging section, the oil which might adhere to the guide plates is removed and also the apparent viscosity of the effluent oil is lowered, therefore, even effluent oil having a high viscosity can be easily collected. Furthermore, since the gathered oil is not allowed to escape because of the rubber guides, the oil collecting efficiency is enhanced.

While the principles of the present invention have been described above in connection with a specific apparatus, it is to be clearly understood that this description is made only by way of example and not as a limitation to the scope of the invention as set forth in the accompanying claim.

What is claimed is:

1. An effluent oil collecting vessel of twin-hull type for collecting effluent oil from a body of water, said vessel comprising:
   parallel flotation hulls spaced from each other;
   a float between said parallel hulls;
   linkage means mounted on both of said parallel hulls and connected to said float for continuously maintaining said float is a horizontal position on the surface of said body of water;
   tank means in said parallel flotation hulls for receiving and separating said effluent oil and water and for storing said effluent oil separated from said water;
   suction pipe means on said float having one end open at the surface of said body water and the opposite end connected to said tank means for sucking in said effluent oil and water on the surface of said body of water and carrying the same to said tank means;
   ejector means in said suction pipe means for creating a suction in said suction pipe means;
   oil converging means at the forward end of said float for converging the flow of effluent oil and water between said parallel hulls toward said suction pipe means on said float;
   a plurality of flexible guide means attached at only one end to said parallel hulls and extending into the space between said hulls in front of said oil converging means at approximately the surface of said body of water for blocking the spaces between said parallel hulls and said oil converging means and for directing said oil and water between said parallel hulls towards said oil converging means;
   high pressure water ejector means directed toward said oil converging means and said suction pipe means for directing high pressure water against said oil converging means and for enhancing the flow of effluent oil and water between said parallel hulls in said oil converging section toward said suction pipe means; and
   high water supply means connected to said high pressure water ejector means, said ejector means and said tank means for taking water from said tank means and supplying high pressure water to said high pressure water ejector means and said ejector means.

2. A vessel as claimed in claim 1, wherein said linkage means is comprised of:
   a vertical mount member on each of said parallel hulls;
   an upwardly directed support rod pivotally connected to each of said mount members; and
   parallel downwardly directed links connecting each of said support rods to said float.

3. A vessel as claimed in claim 1, wherein said tank means is comprised of:
   a first tank containing effluent oil and water, a second tank connected to said first tank for separating said effluent oil and water; and a third tank connected to said second tank for storing the oil separated in said second tank.

5. A vessel as claimed in claim 3, wherein said storage tank means further comprises a drainage pump means for connected to said second tank for exhausting the water separated in said second tank therefrom.

5. A vessel as claimed in claim 1, wherein said oil converging means is comprised of converging guide plates on the front of said float converging toward said opening into said suction pipe means, said guide plates extending both above and below the surface of said body of water.

6. A vessel as claimed in claim 5, wherein said flexible guide means is comprised of rubber guides fixed at one end to said hulls and flexibly entending rearward at an angle in front of said guide plates, the end opposite the end connected to said hull being unrestricted in movement.

* * * * *